United States Patent
Galli et al.

(10) Patent No.: US 7,227,331 B2
(45) Date of Patent: Jun. 5, 2007

(54) SAFETY INTERLOCK AND PROTECTION CIRCUIT FOR PERMANENT MAGNET MOTOR DRIVE

(75) Inventors: Giovanni Galli, Manhattan Beach, CA (US); Toshio Takahashi, Rancho Palos Verde, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/352,719

(22) Filed: Feb. 13, 2006

(65) Prior Publication Data

US 2006/0181239 A1 Aug. 17, 2006

Related U.S. Application Data

(60) Provisional application No. 60/652,861, filed on Feb. 14, 2005.

(51) Int. Cl.
*H02P 3/00* (2006.01)
(52) U.S. Cl. .............. 318/808; 318/807; 318/806; 318/805; 363/34; 363/35; 363/51
(58) Field of Classification Search ............. 318/808, 318/807, 806, 805; 363/35, 34, 51
See application file for complete search history.

(56) References Cited

U.S. PATENT DOCUMENTS

| 4,511,835 | A | * | 4/1985 | Studtmann | 318/700 |
| 4,686,436 | A | * | 8/1987 | Archer | 318/254 |
| 5,838,127 | A | * | 11/1998 | Young et al. | 318/293 |
| 6,005,359 | A | * | 12/1999 | Brambilla et al. | 318/368 |
| 6,078,156 | A | * | 6/2000 | Spurr | 318/368 |
| 2005/0162108 | A1 | * | 7/2005 | Pant et al. | 318/254 |

* cited by examiner

*Primary Examiner*—Rita Leykin
(74) *Attorney, Agent, or Firm*—Ostrolenk, Faber, Gerb & Soffen, LLP

(57) ABSTRACT

A circuit for protecting against controller failure wherein the controller provides control signals for controlling a DC to AC inverter fed by a DC bus and driving a permanent magnet motor, the circuit comprising a first circuit for monitoring the DC bus voltage and, in the event the DC bus voltage exceeds a first threshold due to a counter EMF generated by the motor, for producing a signal to the controller to provide a switch state to the inverter whereby the counter EMF is dissipated substantially in a motor circuit resistance of the permanent magnet motor as a result of a short circuit condition provided by the switch state of the inverter, thereby preventing the DC bus voltage of the inverter from exceeding the first threshold and causing the permanent magnet motor speed to be reduced.

24 Claims, 5 Drawing Sheets

Auto-braking and safety door lock protection function by HVIC

Torque-Speed curve profile under field weakening operation

PM motor braking/short circuit by zero vector

<DC Bus (−)> Line-to-neutral PM motor phase voltage when coasting down

<DC Bus (−)> Summed voltage (at "A") of phase-to-neutral voltage of PM motor

SAFETY INTERLOCK AND PROTECTION CIRCUIT FOR PERMANENT MAGNET MOTOR DRIVE

CROSS-REFERENCE TO RELATED APPLICATION

The present application claims the priority and benefit of U.S. Provisional Application Ser. No. 60/652,861 filed Feb. 14, 2005 entitled SAFETY DOOR LOCK AND PROTECTION CIRCUIT FOR PM MOTOR BASED WASHER APPLICATION, the entire contents of which are hereby incorporated by reference.

BACKGROUND OF THE INVENTION

The present invention relates to a safety interlock and protection circuit used in a DC-AC inverter motor controller driving a permanent magnet motor, for example, driving the drum of a washing machine. The circuit according to the invention performs a door lock function and provides overvoltage protection and motor braking when the main motor controller fails and loses control while the permanent magnet motor is still spinning.

A permanent magnet motor has higher power density and higher torque per ampere than an induction motor. Induction motors have been commonly used in the past in washing machine applications. Permanent magnet motors have been used in more modem washing machines and have become an important power source for energy efficient appliances such as washing machines but also including air conditioners and refrigerators.

Permanent magnet motors are often driven by a DC-AC inverter circuit fed from an AC supply, that is the AC main supply is first converted to a DC voltage which is maintained across a DC bus and the DC bus voltage is then supplied to the inverter to be converted to an AC signal for each of the phases of the permanent magnet motor, typically three phases. A permanent magnet motor, unlike an induction motor, requires additional safety circuits and mechanisms, particularly in the washing machine application with its high speed drum operating in the spin mode.

A microcontroller and/or a DSP (digital signal processor) are common controller components to control the inverter power switches (IGBTs or FETs typically) to apply the desired voltage to the permanent magnet motor. When the controller fails and loses control, traditionally the solution to the problem of a runaway motor has been realized by a separate mechanical solution for the safety door lock and braking mechanism. This solution consists of a discrete relay, timer and crowbar switch with power transistors for overvoltage protection in conjunction with a mechanical brake. While this mechanical solution is achievable, it is prohibitively expensive and complex and also is subject to mechanical failure.

In the event of a controller failure, a permanent magnet motor exhibits two potentially dangerous conditions. One is the condition that a permanent magnet motor spins at high speed when coasting down. In this condition, if the door or the lid of the washer is opened, it creates a safety hazard of bodily injury if a person physically attempts to access the spinning drum. Therefore, it is essential that the door or lid must be locked while the motor spins and preferably the spin speed must be reduced to a stop condition (braked) as quickly as possible in the event of a controller failure.

The other condition is that a permanent magnet motor may generate overvoltage on the DC bus when the controller disengages from energizing the motor as a result of controller failure. This is due to the counter EMF (also known as back EMF) generated by the motor when it spins freely. This voltage can be particularly high when operated under a field weakening control to achieve a very high spin operation. If a failure occurs at this time, the voltage generated is quite high. The voltage is proportional to the product of motor speed ($\omega$) and flux ($\Phi$) generated by the permanent magnet as it moves with respect to the windings. In the field weakening mode, if the controller fails and is unable to control the motor, the weakened flux changes to the full amount of flux due to loss of flux weakening while the motor speed may be reaching more than three or four times its nominal operating speed depending on the spin mode speed. If no action is taken during such a controller failure during field weakening operation, the DC bus voltage, which is nominally rated at about 310 volts DC for a 230 volt AC RMS input main voltage, could reach approximately 1000 volts (three or four times the nominal DC bus voltage). This will result in damaging the power devices and high voltage ICs in the system since they are normally rated at 600 volts for a 230 volt AC RMS main input. The DC bus capacitor can also be damaged. Once damage occurs in the power system, it may no longer be possible to provide a safety door lock/braking mechanism since any circuits on the board likely will be damaged as well or be inoperative. Accordingly, it is necessary to 1) prevent such overvoltage in the event of controller failure, 2) quickly reduce the motor and drum speed and 3) provide a safety interlock to prevent physical injury.

SUMMARY OF THE INVENTION

The present invention does not require any mechanical components for braking or additional power devices to remove and dissipate excess kinetic energy stored in the spinning motor. The present invention provides a simple circuit realized by single or multiple integrated circuits or by either discrete or monolithic components to achieve all of the above objects.

According to the invention, a circuit is provided for protecting against controller failure wherein the controller provides control signals for controlling a DC to AC inverter fed by a DC bus and driving a permanent magnet motor, the circuit comprising a first circuit for monitoring the DC bus voltage and, in the event the DC bus voltage exceeds a first threshold due to a counter EMF generated by the motor, for producing a signal to the controller to provide a switch state to the inverter whereby the counter EMF is dissipated substantially in a motor circuit resistance of the permanent magnet motor as a result of a short circuit condition provided by the switch state of the inverter, thereby preventing the DC bus voltage of the inverter from exceeding the first threshold and causing the permanent magnet motor speed to be reduced.

According to further aspects of the invention, when the DC bus voltage is reduced below a second threshold, the switch state producing the short circuit condition is removed. Should the DC bus voltage again increase beyond the first threshold, the switch state producing the short circuit condition is again reinstated, as many times as necessary to reduce the motor speed to a base value. The first circuit also produces an interlock signal, for example, a door lock signal, to prevent access to the motor driven component. A second circuit monitoring the counter EMF motor phase voltages prevents the interlock signal from being removed until a stop condition is reached.

Other objects, features and advantages of the invention will be apparent from the detailed description which follows.

BRIEF DESCRIPTION OF THE DRAWINGS

The invention will now be described in greater detail in the following detailed description with reference to the drawings in which.

DETAILED DESCRIPTION OF PREFERRED EMBODIMENTS OF THE INVENTION

Figure 1:
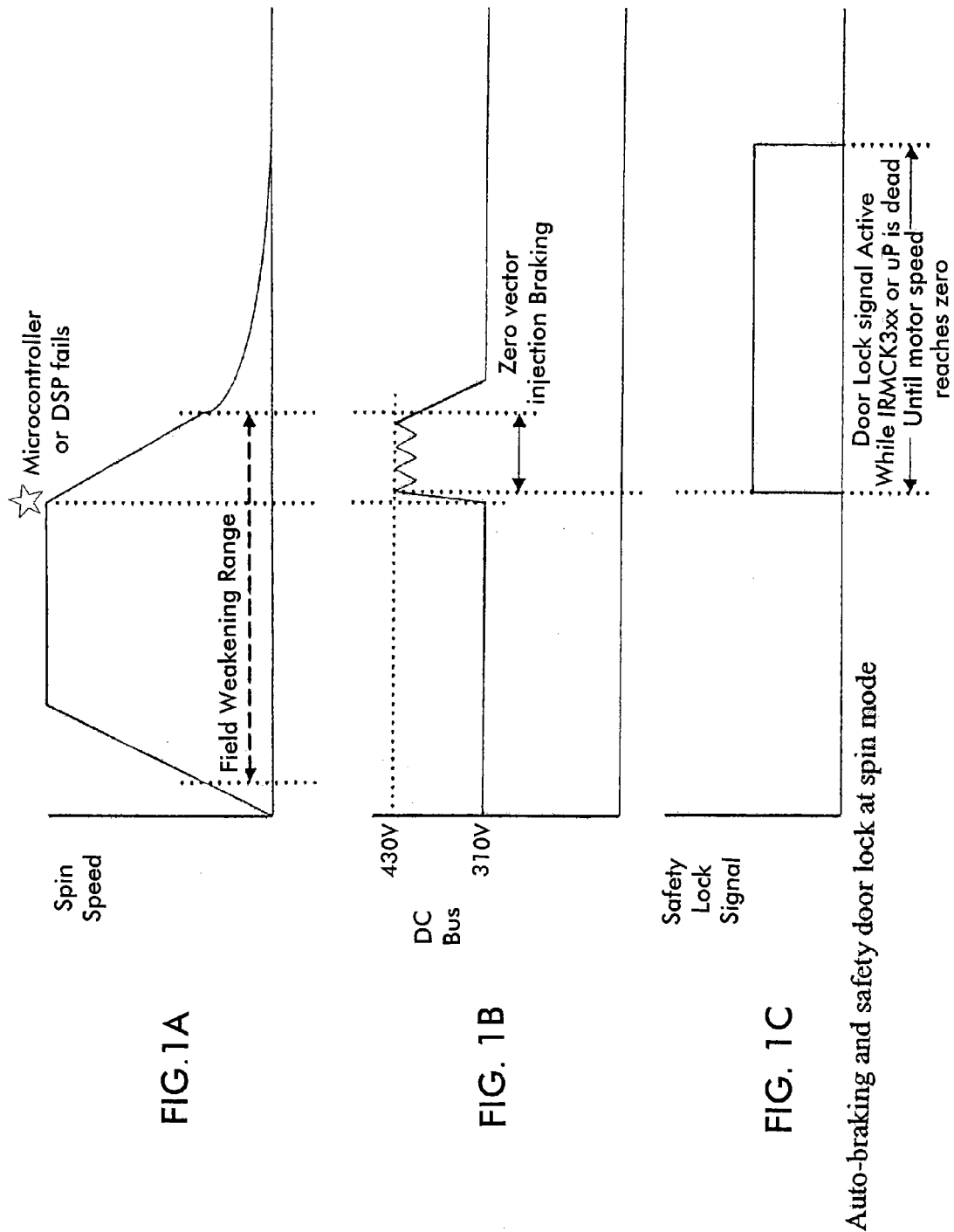
FIG. 1 shows waveforms during a controller failure.
Figure 2:
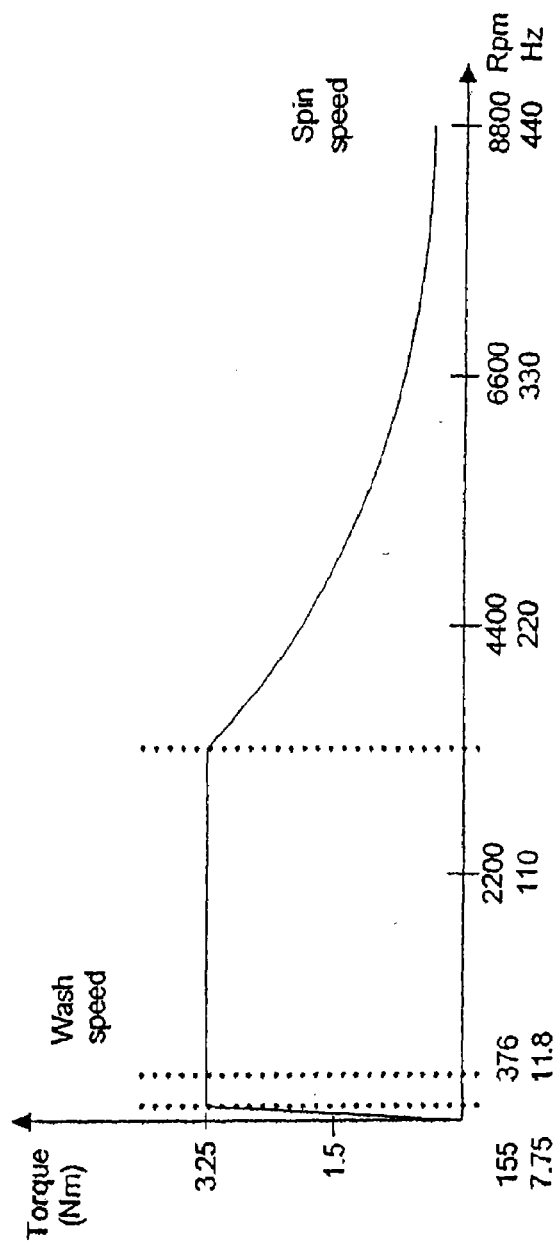
FIG. 2 shows the torque-speed curve profile under a field weakening operation.

With reference now to the drawings, FIG. 1 shows the most hazardous state of conditions if the controller fails during a field weakening operation of the motor during the spin mode. The mode of operation as shown is at high speed spin mode with a deep field weakening operation of the permanent magnet motor. In the case shown, the controller is shown as failing at the very end of the spin mode when the speed is highest in the spin mode and in the deepest area of the field weakening operation. The failure is shown by the star in the top graph (FIG. 1A) of FIG. 1. FIG. 2 shows the motor torque-speed curve. From FIG. 2, the point of failure is near the end of the high speed spinning operation, in the example shown, near 8800 rpm.

Figure 3:
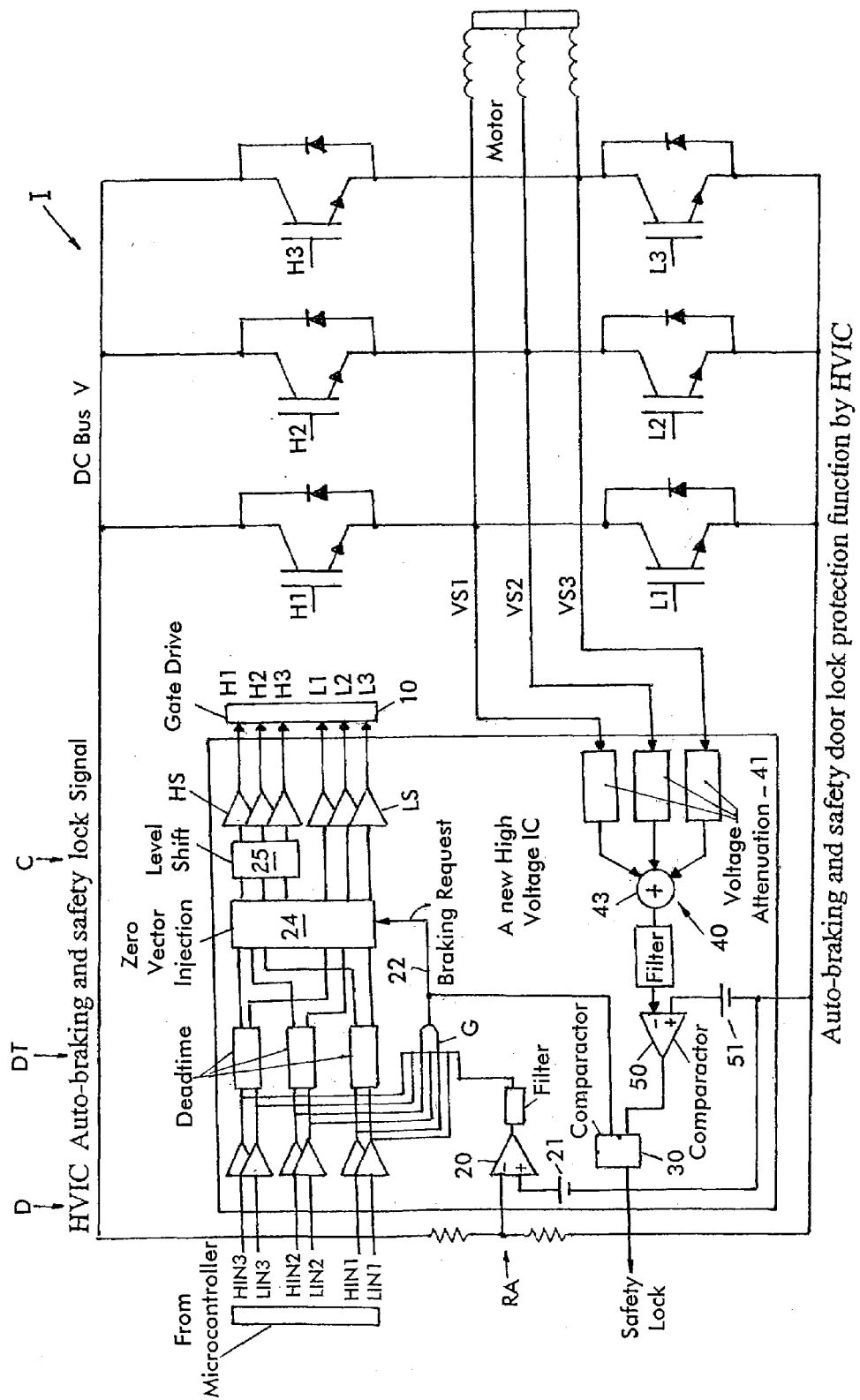
FIG. 3 shows a block/schematic diagram of the overvoltage protection, automatic braking and safety door lock circuit of the present invention.

FIG. 3 shows a portion of a controller C circuit driving the inverter I, which inverter comprises three half bridges comprised of IGBTs, as well known. The control signals to the controller C are provided by a microprocessor or DSP, not shown, providing signals HIN1, LIN1, HIN2, LIN2 and HIN3, LIN3. These signals are provided to driver stages D, dead time circuits DT (to insure that high and low side switches are not on simultaneously) and then to a zero vector insertion circuit 24. The high side control signals are level shifted (25) and provided to high side drivers HS. The low side signals are provided to low side drivers LS. The signals from the drivers HS and LS are provided to gate drive circuit 10 and then to the respective IGBT gates.

As shown, the processor can provide a brake request signal via gate G. However, as described below, in the event of processor failure, a brake request signal 22 can also be called for by a circuit including a comparator 20.

When the controller fails, generally all gate signals applied to the gate drive circuit 10 such as a high voltage gate driver IC 10 are not present. The motor is essentially coasting. If in the field weakening mode of operation, the motor and drum are spinning at high speed, for example, 6000 to 9000 rpm. The DC bus voltage V immediately starts developing higher voltage than nominal voltage, for example increasing the 310 volt DC bus voltage when used with a 230 volt AC RMS main input with a diode rectifying circuit at the front end. This is due to the motor generated counter or back EMF. According to the invention, as soon as the DC bus voltage reaches a highest allowable voltage, for example in this case 430 volts, the gate drive circuit 10 automatically provides a switch state that will short circuit the motor windings, i.e., the zero vector, to the IGBT inverter. This is done by a first circuit having a sensing circuit across the DC bus, for example, the resistor divider RA disposed across the DC bus. A comparator 20 senses when the DC bus voltage exceeds a threshold determined by reference 21, and provides a signal on line 22 to zero vector injection circuit 24, which asserts the zero vector. This zero vector voltage insertion could be either the 000 state corresponding to all lower leg IGBTs of FIG. 3 being on while all high side IGBTs are off, or the 111 state corresponding to all high side IGBTs being on while all low side IGBTs are off, or a combination of the 000 and 111 vectors within a predetermined period cycle. Alternatively, it is possible to turn on only some IGBTs, but it is preferable to turn on all of the top or all of the bottom switches so that all motor phases are short circuited. At this time, the signal 22 also initiates the RS flip-flop latch 30 of FIG. 3 to set the door interlock signal shown as "safety lock" in FIG. 3 to lock the door and prevent the spinning drum from being accessible.

The zero vector protection is, in the embodiment shown, triggered by a combination of controller failure (all gate driver inputs=0) and overvoltage on the DC bus. In such a case, all inputs to gate G will be low, thus triggering the brake request signal. It is only if there is a controller failure that the overvoltage on the DC bus cannot be handled by the controller itself. So in such a situation, all inputs to gate G are low, triggering the braking request signal.

Figure 4:
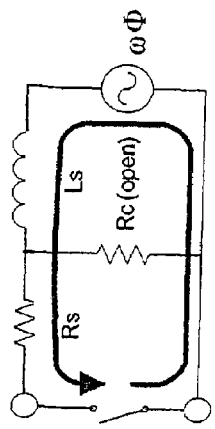
FIG. 4 shows how permanent magnet motor braking and short circuit protection is achieved by applying a zero vector.

As soon as the zero vector gate signal pattern is applied to the IGBT inverter, the permanent magnet motor is shorted by the IGBTs and short circuit current flows within the shorted stator winding as shown in FIG. 4. The counter EMF generated by the motor is indicated by $\omega\Phi$ in FIG. 4. Therefore, the kinetic energy stored in the motor is dissipated mainly through the stator resistance $R_S$ and consequently, the DC bus voltage decreases toward the nominal bus voltage, in this example, approximately 310 volts DC. When the DC bus voltage reaches a second threshold voltage of, say 360 volts, which can be set by hysteresis in comparator 20, then the zero vector injection ceases and all gate drive signals to each of the IGBTs are turned off. As soon as all the IGBTs are turned off, the permanent magnet motor, which is still spinning at a lower speed, starts increasing the DC bus voltage again and when and if it again reaches the first threshold, for example 430 volts, the circuit will again engage the zero vector. This insertion and disengagement of the zero vector will repeatedly continue until the motor speed is below a base speed, in this example, below 3100 rpm.

Figure 5:
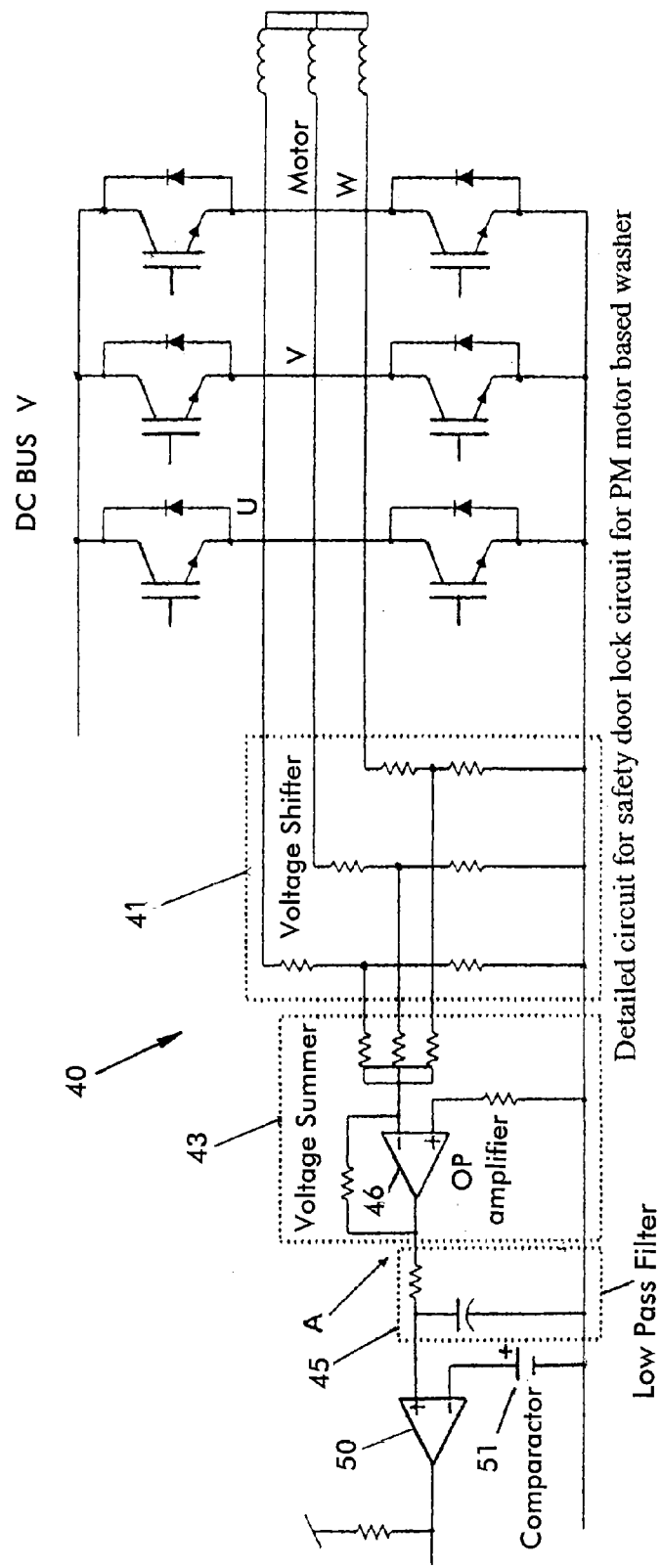
FIG. 5 shows details of a circuit for the safety door lock for a permanent magnet motor based washing machine.

The motor speed is monitored by a second circuit 40, which monitors the motor phase voltages when the motor is coasting down. At the base speed, the motor no longer creates an overvoltage on the DC bus since the counter EMF voltage is lower than the nominal DC bus voltage. Therefore, zero vector injection will no longer be necessary below the base speed and the zero voltage injection no longer will be performed. The motor will coast down by freewheeling toward zero speed. During this coasting down, the second circuit 40 as shown in FIG. 3 and FIG. 5 monitors the three phase motor voltages and detects the condition that the motor is still spinning. FIG. 5 shows details of the circuit 40 of FIG. 3 including the voltage shifter/attenuation circuit 41 (three resistor divider circuits) and the voltage summer 43 as well as the low pass filter 45 and comparator 50 of FIG. 3. Comparator 50 is provided with a reference 51 which is compared to the filtered phase voltage. As soon as the motor comes to a stop, the comparator 50 generates a high to low transition at the comparator output of FIG. 5 which will trigger the reset of the RS flip-flop to remove the safety lock signal so that the door or lid can be opened.

As shown in FIG. 5, the second circuit to detect the freewheeling motor speed is realized by a single comparator 50 and operational amplifier 46 with capacitors and resistors and the voltage divider/attenuator circuit 41.

Figure 6:
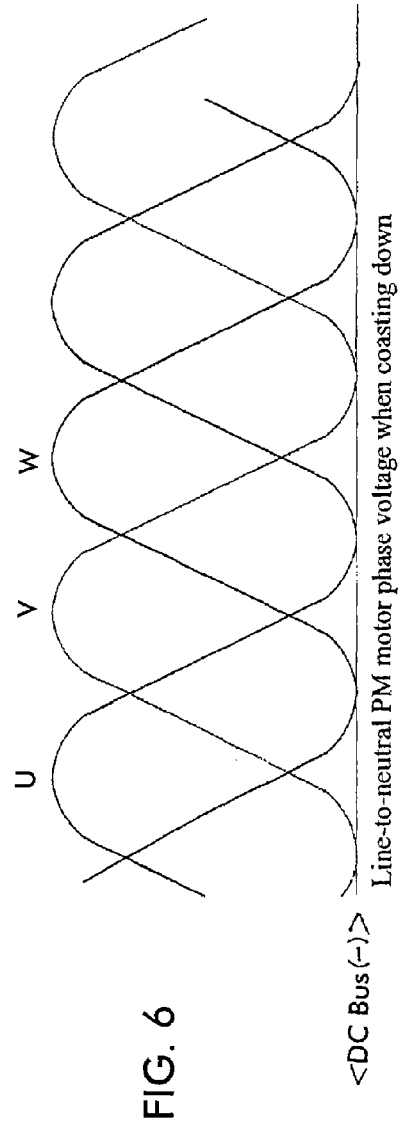
FIG. 6 shows the line to neutral permanent magnet motor phase voltages when coasting down.
Figure 7:
FIG. 7 shows the summed voltage at point A in FIG. 5 of the phase to neutral voltage of the permanent magnet motor.

In FIG. 5, the comparator 50 input signal is a linear signal which represents the speed of the freewheeling motor. A relatively small RC filter network 45 is used since the input signal only has a small amount of ripple voltage due to summation of three phase voltage waveforms when compared, for example, to a single voltage line to neutral waveform. This is shown in FIG. 6. Providing the sum of the three phase line to neutral voltage waveforms allows reproducing a reliable representation of the speed of the free running motor as shown in FIG. 7.

FIG. 1B shows the DC bus voltage being reduced by the application of the zero vector, with corresponding braking. FIG. 1C shows the interlock signal.

The present invention provides a number of benefits and potential uses, in particular, the invention eliminates the bulky, expensive and potentially unreliable discrete relay circuits and mechanical components, for example mechanical brakes, in prior art washer systems. The circuit can be implemented in discrete components or using discrete integrated circuits or monolithic integrated circuits such as high voltage ICs.

Applications can be expanded beyond washers and are not to be limited only by washer applications. For example, the present invention can be used to brake a high speed spindle drive and/or any other permanent magnet motor drive applications which require a safety interlock signal and/or braking and/or overvoltage protection while the permanent magnet motor is spinning.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A circuit for protecting against controller failure wherein the controller provides control signals for controlling a DC to AC inverter fed by a DC bus and driving a permanent magnet motor, the circuit comprising:
a first circuit for monitoring the DC bus voltage and, in the event the DC bus voltage exceeds a first threshold due to a counter EMF generated by the motor, for producing a signal to the controller to provide a switch state to the inverter whereby the counter EMF is dissipated substantially in a motor circuit resistance of the permanent magnet motor as a result of a short circuit condition provided by the switch state of the inverter, thereby preventing the DC bus voltage of the inverter from exceeding the first threshold and causing the permanent magnet motor speed to be reduced.

2. The circuit of claim 1, further wherein the first circuit issues an interlock signal which will keep an enclosure housing the permanent magnet motor or a device driven by the motor locked while the motor is spinning.

3. The circuit of claim 2, wherein the permanent magnet motor drives the drum of a washing machine and the safety interlock signal prevents a door providing access to a rotating drum driven by the permanent magnet motor from being opened.

4. The circuit of claim 2, wherein the first circuit comprises a first sensing circuit coupled to DC bus for monitoring the DC bus voltage, and a comparator for comparing the sensed voltage to a reference voltage and for producing a first signal to cause the controller to provide the switch state causing the short circuit condition.

5. The circuit of claim 4, wherein the interlock signal is generated from said first signal.

6. The circuit of claim 4, wherein the switch state comprises the zero vector.

7. The circuit of claim 6, wherein the zero vector is the switch state 111 or 000.

8. The circuit of claim 1, wherein when the DC bus voltage is reduced below a second threshold, the switch state producing the short circuit condition is removed.

9. The circuit of claim 8, wherein the second threshold is above a nominal DC bus voltage.

10. The circuit of claim 8, wherein, should the DC bus voltage again increase beyond the first threshold, the switch state producing the short circuit condition is again reinstated by said first circuit, as many times as necessary to reduce the motor speed to a base value.

11. The circuit of claim 2, further comprising a second circuit monitoring the counter EMF generated by the motor.

12. The circuit of claim 11, wherein the second circuit comprises a second sensing circuit for each phase of the permanent magnet motor, the second sensing circuits each providing an output to a voltage summing circuit for summing the outputs to provide a summed output which is provided to the input of a further comparator for comparing said summed output to a further threshold to determine when the speed of the motor is reduced to a stopped condition.

13. The circuit of claim 10, wherein said summed output is low pass filtered before being provided to said further comparator.

14. The circuit of claim 1, wherein the switch state comprises the 000 or 111 vector or a combination of said 000 and 111 vectors applied in discrete time periods.

15. The circuit of claim 4, wherein the first sensing circuit comprises a resistor divider.

16. The circuit of claim 12, wherein the second sensing circuits each comprise a resistor divider circuit.

17. The circuit of claim 12, wherein the voltage summing circuit comprises an operational amplifier circuit.

18. The circuit of claim 11, wherein the second circuit prevents the interlock signal from being removed until the motor speed is substantially zero.

19. The circuit of claim 2, wherein the first circuit provides a signal to a latch circuit for issuing said interlock signal.

20. The circuit of claim 1, wherein the permanent magnet motor comprises a three phase permanent magnet motor.

21. The circuit of claim 1, wherein the motor circuit resistance comprises a resistance of the stator of the motor.

22. The circuit of claim 19, wherein the first circuit generates a first signal provided to one input of said latch circuit and the second circuit generates a second signal provided to a second input of said latch circuit.

23. The circuit of claim 22, wherein the first signal sets said latch circuit to provide said interlock signal and the second circuit resets the latch circuit to remove the interlock signal.

24. The circuit of claim 1, wherein the motor is operated with field weakening.

* * * * *